United States Patent [19]

Schwarzenbach

[11] 4,330,997
[45] May 25, 1982

[54] FEEDWATER HEATING IN A STEAM TURBINE

[75] Inventor: Alfred Schwarzenbach, Wettingen, Switzerland

[73] Assignee: BBC Brown, Boveri & Company, Ltd., Baden, Switzerland

[21] Appl. No.: 89,891

[22] Filed: Oct. 31, 1979

[30] Foreign Application Priority Data

Nov. 9, 1978 [CH] Switzerland ............ 11523/78

[51] Int. Cl.³ ............................................ F01K 7/34
[52] U.S. Cl. ................................. 60/678; 60/648; 60/691
[58] Field of Search ............ 60/648, 654, 662, 677, 60/678, 691, 663

[56] References Cited

U.S. PATENT DOCUMENTS

| | | | |
|---|---|---|---|
| 1,573,851 | 2/1926 | Nyffenegger | 60/678 X |
| 1,726,730 | 9/1929 | Backstrom et al. | 60/648 X |
| 3,724,214 | 4/1973 | Bryant | 60/648 X |
| 4,042,809 | 8/1977 | Shetler | 60/648 X |
| 4,130,992 | 12/1978 | Bitterlich et al. | 60/678 X |

FOREIGN PATENT DOCUMENTS 1035161 7/1958 Fed. Rep. of Germany ........ 60/677

Primary Examiner—Allen M. Ostrager
Assistant Examiner—Stephen F. Husar
Attorney, Agent, or Firm—Burns, Doane, Swecker & Mathis

[57] ABSTRACT

The present invention relates to a method and apparatus for feedwater heating in an industrial steam turbine. Process steam for industrial purposes is extracted from at least one stage of a multistage turbine. An expansion of a portion of process steam is provided to decrease the steam pressure to a lower pressure level than that of the lowest process steam network. The further expanded steam is used for heating the feedwater which consists of recirculated condensate and makeup water. The portion of the process steam is preferably expanded in a further turbine stage connected downstream from the last turbine stage of the multistage turbine from which process steam is extracted. At least one further feedheater with lower pressure is also provided to receive the expanded portion of the steam.

11 Claims, 1 Drawing Figure

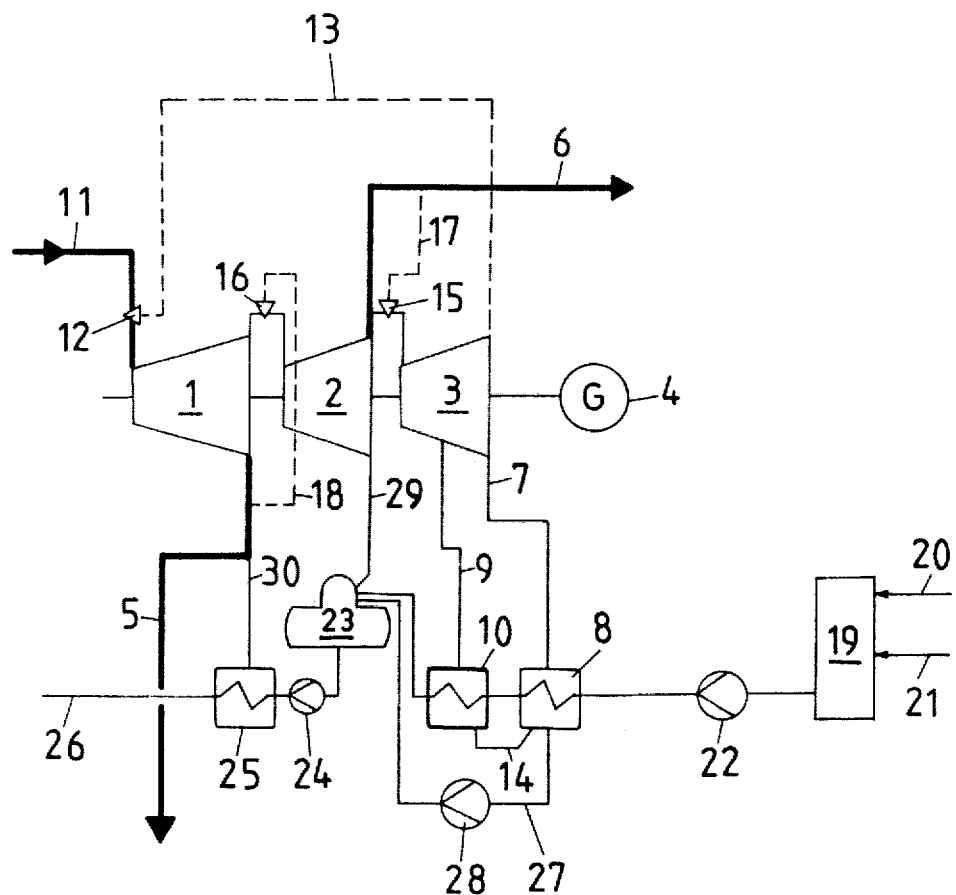

FEEDWATER HEATING IN A STEAM TURBINE

BACKGROUND AND SUMMARY OF THE PRESENT INVENTION

The present invention relates to an apparatus and method for feedwater heating in an industrial steam turbine.

In known condensing reheat steam turbines, the working steam discharges the residual heat in a condenser to the surroundings after expansion of the steam in the last turbine stage. This discharge produces a cold condensate which is reheated by a multistage heating unit using steam extracted from the turbine.

In industrial plants, steam which is used for heating purposes must have a varying pressure level depending on the application. Before the steam is utilized for industrialized heating purposes, the steam produces mechanical energy in the turbine or, as the case may be, electrical energy in a generator coupled to the turbine. With a combined energy utilization of the steam, i.e., heat-power coupling, it is possible to achieve a relatively high degree of utilization of primary energy of the steam.

These known industrial plants are disadvantageous in that condenser components for small plants operate quite uneconomically.

For this reason, in backpressure or backpressure pass-off turbines, the steam is expanded in the turbine to the level of the lowest process steam pressure.

In these plants, it has been found to be disadvantageous to have the condensate flowing back from the steam users (for example in the paper industry from the cookers and paper machinery) into the heater because the condensate is, in most cases, heavily contaminated and also must be further cooled. With a recirculation temperature of over 70° C., for example, the condensate must be further cooled down before running through a purification plant. For this reason, a purification step is waived in most industrial plants and the contaminated condensate is simply discharged. The quantity of condensate which is lost thereby must be replaced by purified fresh or makeup water. Since this fresh or makeup water is cold, it must be heated up to a temperature suitable for the steam boiler. Particularly in the case of backpressure or backpressure pass-off turbines, the steam at a pressure level of the process steam network is used for the heating step. However, if the pressure of the lowest process steam network is relatively high, large losses can occur as a result of this heating step.

It is an object of the present invention to provide a device for feedwater heating in industrial steam turbines in which one portion of the steam is expanded to a lower pressure level than that of the lowest process steam network. The further expanded steam is to be used for heating a purified condensate and feedwater.

The above-mentioned object and others are achieved according to the present invention by providing at least one further turbine stage downstream from the last turbine stage for expanding one portion of the process steam. Additionally, at least one additional feedheater with lower pressure is provided.

The apparatus according to the present invention provides a double pass-off backpressure turbine for supplying two process steam networks with steam. The present invention provides an advantage over known plants of this type which require condenser components for efficient feedwater heating. The present invention provides efficient feedwater heating without entailing the costs associated with a large condenser component or an entire condenser plant. Further, with the present invention, it is possible to achieve an increased steam turbine capacity with a given process steam quantity. Also, the temperature differences in the feedheating process are decreased resulting in diminished energy losses, i.e., the loss of the utilizable energy from the steam is diminished.

According to a further feature of the present invention, a flow control element is installed in a live steam line upstream from the steam intake into the steam turbine in order to maintain the lowest feedheater pressure constant.

By utilizing the flow control element, the feedheating works independently of the process steam quantities taken from the turbine. Therefore, extraction steam heaters connected downstream automatically reach almost constant pressure without control.

BRIEF DESCRIPTION OF THE DRAWING

The single FIGURE is a schematic representation of a steam turbine plant according to the present invention.

DETAILED DESCRIPTION OF THE PREFERRED EMBODIMENT

With reference to the single FIGURE, steam from a boiler (not shown) is delivered to a turbine through a live steam line 11. The steam turbine consists of first and second turbine components 1,2. Each turbine component may be single stage or multistaged. The turbine components 1,2 drive a generator 4. Downstream from both the first turbine component 1 and the second turbine component 2, expanded process steam is removed for industrial steam networks through first and second process steam lines 5, 6 respectively.

To control the quantity of process steam removed, a first control valve 15 is provided downstream from the second turbine component 2. The first control valve 15 is actuated through a first control signal line 17 connected in the second process steam line 6. A second control valve 16 is provided downstream from the first turbine component 1. The second control valve 16 is actuated through a second control signal line 18 connected in the first process steam line 5.

The condensate recovered from the process steam is received in a collecting tank 19. The tank 19 is provided with connections 20,21 in which the recirculation condensate is mixed with purified fresh or makeup water (for example in a ratio of ⅓ to ⅔ recirculation condensate). The mixture from the tank 19 is then passed through a pure water pump 22 into first and second feedheaters 8,10.

According to a preferred embodiment of the present invention, at least one further turbine stage 3 is connected downstream from the first and the second steam turbine components 1, 2. The further stage 3 is installed on the same shaft as the first and second turbine components. Steam is delivered to the further turbine stage 3 from the second process steam line 6. This steam is expanded in the further turbine stage 3 and delivered to the first feedheater 8 through a line 7. Steam is withdrawn from the further turbine stage 3 through an extraction line 9 and acts upon the second feedheater 10.

Before entry into the first turbine component 1, a live steam control valve 12 installed in the live steam line 11 is actuated through a control signal line 13. The control signal line 13 is connected to the outlet of the further turbine stage 3. In this manner, the steam supplied to the first feedheater 8 from the further turbine stage 3 is constantly maintained at the lowest feedheater pressure independently of the process steam quantity removed. The first and the second feedheaters 8,10 are connected with each other through a drain line 14.

The water passing through the first and the second feedheaters 8,10 is heated, for example, to a temperature of 150° C. after leaving the second feedheater 10. The heated pure water then passes into a third feedheater 23. The third feedheater 23 is supplied with extraction steam from the second turbine component through a feedheating line 29. The extracted steam from the second turbine component 2 corresponds to the lowest process steam pressure. The water passing through the third feedheater 23 is heated to a temperature of about 200° C. A feedpump 24 then transports the heated pure water/condensate mixture through a fourth feedheater 25. The fourth feedheater 25 is heated by steam extracted from the first process steam line 5 through a line 30. The heated water is transported in a feedline 26 into the steam boiler (not illustrated).

The first and the third feedheater 8, 23 are connected with each other both through a condensate line 27 and a feedheater-condensate pump 28. In this way, the condensate formed in the first feedheater 8 and in the second feedheater 10 (connected thereby through the connecting line 14) can also be delivered to the third feedheater 23.

The principles and preferred embodiment of the present invention has been described in the foregoing specification. However, the invention which is intended to be protected is not to be construed as limited to the particular embodiment disclosed. The embodiment is to be regarded as illustrative rather than restrictive. Variations and changes may be made by those skilled in the art without departing from the spirit of the present invention.

What is claimed is:

1. An apparatus for feedwater heating in a steam turbine plant without a condenser component comprising:
   at least a first turbine component having at least one stage;
   extraction means for extracting process steam for industrial purposes from at least the last stage of the first turbine component;
   means for withdrawing a portion of the steam from the process steam downstream from the last turbine stage having extraction means;
   a further turbine component having at least one stage for expanding the portion of the steam withdrawn from the process steam downstream from the last turbine stage having extraction means;
   first feedheater means for heating feedwater for the first turbine component; and
   first line means for conducting the entire expanded portion of the steam from the last stage of the further component directly to the first feedheater means to heat the feedwater in the first feedheater means.

2. The apparatus of claim 1 further comprising second line means for conducting a portion of the steam from a previous stage of the further turbine component to a second feedheater means for further heating the feedwater, the second feedheater means being connected downstream from the first feedheater means.

3. The apparatus of claim 2 further comprising drain line means for collecting condensate connected between the first feedheater means and the second feedheater means.

4. The apparatus of claim 1 further comprising flow control means for controlling the quantity of steam supplied to the first turbine component in response to the flow through the further turbine component.

5. The apparatus of claim 1 further comprising a second turbine component, the extraction means comprising first and second process steam lines for industrial purposes connected with the first and the second turbine components respectively.

6. The apparatus of claim 5 further comprising:
   first control valve means for controlling the quantity of process steam extracted from the second turbine component disposed downstream from the second turbine component and controlled through a first control signal line connected in the second process steam line; and
   second control valve means for controlling the quantity of process steam extracted from the first turbine component disposed downstream from the first turbine component and controlled through a second control signal line connected in the first process steam line.

7. The apparatus of claim 1 further comprising tank means both for receiving and for mixing recirculation water and makeup water to form the feedwater to be heated.

8. A method of heating feedwater in a steam turbine plant without a condenser component comprising the steps of:
   delivering steam to at least a first turbine stage;
   extracting process steam for industrial purposes from at least the last turbine stage;
   withdrawing a portion of the steam from the process steam;
   expanding the portion of the steam in an additional turbine component having at least one stage arranged downstream from the last turbine stage wherein said process steam is extracted;
   delivering feedwater composed of recirculation and makeup water to a first feedheater to be heated; and
   delivering the entire expanded portion of the steam from the last stage of the additional turbine component directly to the feedwater to heat both the recirculation and the makeup water.

9. The method of claim 8 further comprising the steps of:
   withdrawing a portion of the steam from the additional turbine component; and
   delivering the portion of the steam withdrawn from the additional turbine component to a second feedheater connected downstream from the first feedheater to further heat the feedwater.

10. The method of claim 8 further comprising the step of controlling the quantity of steam delivered to the first turbine stage responsive to the output of the additional turbine component.

11. The method of claim 8 further comprising the step of controlling the amount of process steam extracted from the at least one turbine stage.

* * * * *